United States Patent Office 3,366,715
Patented Jan. 30, 1968

3,366,715
CROTONIC ACID, 3-HYDROXY, (HALO)ALKENYL OR (HALO)ALKYNYL ESTER, DI LOWER (HALO) ALKYL PHOSPHATES
Juan G. Morales, Modesto, Calif., assignor to Shell Oil Company, New York, N.Y., a corporation of Delaware
No Drawing. Filed Nov. 27, 1964, Ser. No. 414,435
12 Claims. (Cl. 260—941)

ABSTRACT OF THE DISCLOSURE

Insecticidal esters of crotonic acid phosphates such as crotonic acid, 3-hydroxy-, allyl ester, dimethyl phosphate.

---

This invention relates to novel organophosphorus compounds which have been found to be effective for the control of mites and aphids.

It has been found that crotonates represented by the formula:

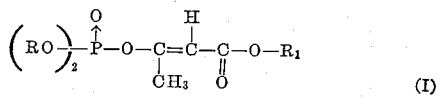

(I)

wherein R represents alkyl of one to four carbon atoms or haloalkyl of one to four carbon atoms and $R_1$ represents alkenyl or alkynyl of up to six carbon atoms or mono-halogen-substituted alkenyl or alkynyl of up to six carbon atoms, are effective miticides and insecticides. When applied to crops at dosages which will effectively control mites and insects, the compounds of the invention are non-injurious to the plants so treated. This combination of a high order of effectiveness at low dosages and absense of phytotoxicity to the crop to be protected makes the crotonates of the invention attractive candidates in the field of plant protection.

The compounds of the invention, characterized by the attachment of an unsaturated moiety to the carbonyl function of the molecule, have surprising and unexpectedly high toxicity to mites. This property not only makes the subject compounds highly useful for the control of phytophagous mites but of considerable promise for the control of mites of medical importance—especially those mites which transmit disease. In addition these crotonates are also toxic to a broad spectrum of economically important insects.

In the crotonates of the invention, R suitably is either straight-chain or branched-chain alkyl or middle halogen-substituted alkyl (preferably mono-halogen-substituted) of one to four carbon atoms. $R_1$ suitably is an unsubstituted or mono (middle-halogen)-substituted alkenyl or alkynyl moiety of up to six carbon atoms, which may be straight- or branched-chain, in which the unsaturation lies in the beta to omega positions—that is to say, the unsaturation occurs between any two carbon atoms of the chain excepting the carbon atoms bonded to the oxygen atom of the oxy-carbonyl moiety. By "middle halogen" is meant chlorine and bromine.

Examples of this new class of crotonates include:

crotonic acid, 3-hydroxy-, allyl ester, diethyl phosphate
crotonic acid, 3-hydroxy-, allyl ester, di-isopropyl phosphate
crotonic acid, 3-hydroxy-, allyl ester, dibutyl phosphate
crotonic acid, 3-hydroxy-, allyl ester, di(chloromethyl) phosphate
crotonic acid, 3-hydroxy-, allyl ester, di(bromomethyl) phosphate
crotonic acid, 3-hydroxy-, allyl ester, methyl chloromethyl phosphate
crotonic acid, 3-hydroxy-, allyl ester, di(2-chloroethyl) phosphate
crotonic acid, 3-hydroxy-, allyl ester, ethyl 2-chloroethyl phosphate
crotonic acid, 3-hydroxy-, cis, 2-propynyl ester, diethyl phosphate
crotonic acid, 3-hydroxy-, cis, 2-propynyl ester, dibutyl phosphate
crotonic acid, 3-hydroxy-, cis, 2-propynyl ester, di(cloromethyl) phosphate
crotonic acid, 3-hydroxy-, cis, 2-propynyl ester, ethyl 2-chloroethyl phosphate
crotonic acid, 3-hydroxy-, cis, 2-propynyl ester, di(chloroethyl) phosphate
crotonic acid, 3-hydroxy, cis, 2-butenyl ester, diethyl phosphate
crotonic acid, 3-hydroxy-, cis, 2-butenyl ester, di-isopropyl phosphate
crotonic acid, 3-hydroxy-, cis, 2-butenyl ester, di(chloromethyl) phosphate
crotonic acid, 3-hydroxy-, cis, 2-butenyl ester, di(bromomethyl) phosphate
crotonic acid, 3-hydroxy-, cis, 2-butenyl ester, di(2-chloroethyl) phosphate
crotonic acid, 3-hydroxy-, cis, 3-chloro-1,1-dimethyl-2-propynyl ester, diethyl phosphate
crotonic acid, 3-chloro-1,1-dimethyl-2-propynyl ester, di(chloromethyl) phosphate The compounds of the invention wherein R is methyl are to be preferred because of their outstandingly high insecticidal activity.

Preferred because of their particular insecticidal properties are those crotonates of the invention wherein $R_1$ represents allyl or propargyl. Exemplary of such crotonic acid esters are crotonic acid, 3-hydroxy-, allyl ester, dimethyl phosphate, crotonic acid, 3-hydroxy-, propynyl ester, dimethyl phosphate, crotonic acid, 3-hydroxy-, propynyl ester, diethyl phosphate, crotonic acid, 3-hydroxy-, allyl ester, diethyl phosphate and crotonic acid, 3-hydroxy-, 2-butenyl ester, dimethyl phosphate.

A further preferred subclass are those wherein $R_1$ is mono-(middle halogen)-substituted alkenyl or alkynyl. The chloropropynyl esters have been found to be especially active. Typical crotonates of this subclass are crotonic acid, 3-hydroxy-, 3-chloro-1,1-dimethyl-2-propynyl ester, dimethyl phosphate, crotonic acid, 3-hydroxy, 3-bromo-1,1-dimethyl-2-propynyl ester, dimethyl phosphate, crotonic acid, 3-hydroxy, 3-chloro-1,1-dimethyl-2-propynyl ester, diethyl phosphate, and crotonic acid, 3-hydroxy-, chloroallyl ester, dimethyl phosphate.

Of special interest are those compounds of the invention represented by the following structural formulae:

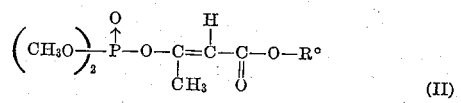

(II)

wherein R° represents allyl, 2-chloroallyl or 2-bromoallyl; and

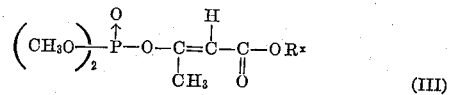

(III)

wherein $R^x$ represents propargyl, chloropropynyl, or bromopropynyl.

The alkenyl esters of the invention are conveniently prepared by an ester exchange between a simple hydrocarbyl alcohol having an alkenyl group and an ester of a 2 halo-substituted fatty acid in the presence of an acid catalyst to yield the reaction product according to the equation:

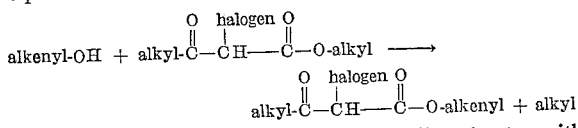

Then reacting the 2-halo-substituted alkenyl ester with a trialkyl phosphite. The reaction is started at temperatures slightly above room temperature (30–40° C.). The addition of more heat is made slowly to avoid any undue temperature rise to this mildly exothermic reaction. The desired temperature range of the reaction is between 70–100° C.

The alkynyl compounds of the invention may be conveniently prepared by the addition of an alcohol containing an alkynyl group to the halide of an appropriate crotonic acid according to the schematic equation:

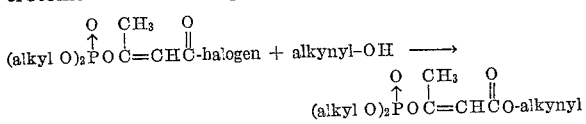

The following examples are offered to illustrate how certain select compounds of the invention are synthesized and to illustrate their activity to some species of mites and insects. These examples are not to be construed as in any way limiting the scope of the invention. In the following examples, the parts given are by weight unless otherwise noted.

*Example I.—Preparation of allyl 2-chloroacetoacetate*

A mixture containing 200 parts of methyl 2-chloroacetoacetate and 116 parts of allyl alcohol with 2 parts of a p-toluene sulfonic acid as a catalyst were heated at reflux (110°–140° C.) for 6 hours while the methanol formed was removed using a fractionating column. The remaining kettle contents were distilled and the fraction distilling at 103-111° C. was collected. This fraction was dissolved in methylene chloride and extracted with 2% aqueous sodium hydroxide at 10° C. The aqueous phase was acidified with 6 N hydrochloric acid and extracted with methylene chloride. The organic phase was concentrated and distilled to give allyl 2-chloroacetoacetate.

*Example II.—Preparation of crotonic acid, 3-hydroxy-, allyl ester, dimethyl phosphate*

17.6 parts of allyl 2-chloroacetoacetate and 12.4 parts of trimethyl phosphite were mixed at 30° C. A mildly exothermic reaction occurred with the temperature rising to 45° C. The mixture was then heated to 90° C. for 1 hour, then stripped at 130° C. The kettle contents were then distilled, collecting the crotonic acid, 3-hydroxy-, allyl ester, dimethyl phosphate. The structure was confirmed by infrared and elemental analysis: viz (percent by weight).

Calculated for $PO_6C_9H_{15}$: P, 12.4. Found: P, 11.6; Cl, 12.0.

*Example III.—Preparation of crotonic acid, 3-hydroxy-, cis, 3-chloro-1,1-dimethyl-2-propynyl ester, dimethyl phosphate*

Crotonyl chloride, 3-hydroxy- cis, dimethyl phosphate was prepared by the hydrogenolysis of crotonic acid, 3-hydroxy, α-methylbenzyl ester, dimethyl phosphate (Spencer and Todd, J. Chem. Soc., 1958, 2968) and chlorination of the reaction product with sulfuryl chloride.

25.8 parts of the crotonyl chloride, as prepared above, 10.7 parts of 4-chloro-2-methyl-3-butyn-2-ol and 40 parts of carbon tetrachloride were mixed and heated to reflux for 2½ hours. The mixture was then stripped on a rotary evaporator at 45° C. to remove the solvent and give 31.5 parts of crotonic acid, 3-hydroxy-, cis, 3-chloro-1,1-dimethyl-2-propynyl ester, dimethyl phosphate. The structure was confirmed by infrared and elemental analysis: viz (percent by weight).

Calculated for $PO_6ClC_{11}H_{16}$: P, 10.0; Cl, 11.4. Found: P, 11.2; Cl, 10.9.

*Example IV.—Evaluation of subject crotonates on mites and aphids*

The compounds were tested against the two-spotted spider mite (*Tetranychus telarius*) and the pea aphid (*Macrosiphum pisi*) by spraying infected plants with a series of concentrations and determining the $LC_{50}$ (the concentration required to kill 50%) in each case. The tests were replicated and run on three separate days comparing the $LC_{50}$ with that of the standard, parathion. The results were expressed as a toxicity index (Sun, J. Econ. Ent., 43:45, 1950). A compound having a toxicity index of 100 is equal to parathion, one having a toxicity index of 200 is twice as effective, while a 50 value would be one-half as toxic as parathion. The results are summarized in Table 1.

TABLE 1.—TOXICITY OF ALLYL AND PROPARGYL CROTONATES ON MITES AND APHIDS

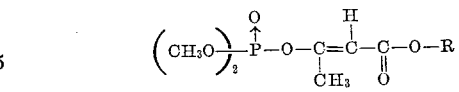

| R | Toxicity index | |
|---|---|---|
| | 2-spotted spider mite | Pea aphid |
| —CH₂C≡CH | 2,555 | 175 |
| —C(CH₃)₂C≡CCl | 2,000 | 230 |
| —CH₂CH=CH₂ | 1,000 | 140 |
| —CH₂CH=CHCH₃ | 680 | 320 |
| Parathion | 100 | 100 |

*Example V.—Toxicity of crotonates to house flies, rice weevils, boll weevils and corn earworms*

The toxicity of the subject compounds was tested against house flies by spraying solutions of the test compound in kerosene in a spray tunnel (Soap and San. Chem., 24:133, 1948). Rice weevils were evaluated by a dip method. Cotton boll weevils were tested by application of acetone solutions topically upon the thorax of the weevils. The corn earworms were tested by placing uniform size worms upon freshly sprayed plants. The results are presented in Table II in terms of the lethal concentration required to kill 50% of the insects ($LC_{50}$).

TABLE II.—TOXICITY OF ALLYL AND PROPARGYL CROTONATES ON HOUSE FLIES, RICE WEEVILS, BOLL WEEVILS AND CORN EARWORMS

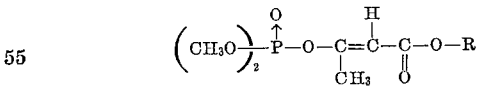

| R | $LC_{50}$ | | | |
|---|---|---|---|---|
| | House fly | Rice Weevil | Boll Weevil | Corn Earworm |
| —CH₂C≡CH | .0094 | .0039 | .05 | .0046 |
| —C(CH₃)₂C≡CCl | .0095 | .1 | .19 | .0109 |
| —CH₂CH=CH₂ | .013 | .013 | .33 | |
| —CH₂CH=CHCH₃ | .0096 | .031 | .035 | |

It is thus evident that the compounds of this invention are effective insecticides, the term "insect" including not only the members of the class Insecta, but also related or similar non-vertebrate animal organisms belonging to the allied classes of anthropods and including mites, ticks, spiders, wood lice, and the like.

The compounds of this invention can be employed for insecticidal purposes by the use of any of the methods which are conventionally employed in that art. For example, the compounds can either be sprayed or otherwise applied in the form of a solution or dispersion, or they can be absorbed on an inert, finely-divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl acid sulfonates, long chain alkyl sulfonates, phenol ethylene oxide condensates, ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime gypsum, pyrophyllite and similar inert solid diluents. If desired, the compounds of the present invention can be employed as an aerosol, as by dispersing the same into the atmosphere by means of a compressed gas.

The concentration of the compounds to be used with the above carriers is dependent upon many factors, including the carrier employed, the method and conditions of application, and the insect species to be controlled, a proper consideration and resolution of these factors being within the skill of those versed in the insecticide art. In general, however, the compounds of this invention are effective in concentrations of from about 0.01% to 0.5% based upon the total weight of the composition, though under some circumstances as little as about 0.00001% or as much as 2% or even more of the compound can be employed with good results from an insecticidal standpoint. Concentrates suitable for sale for dilution in the field may contain as much as 25–50% by weight, or even more, of the insecticide.

When employed as insecticides, the compounds of this invention can be employed either as the sole toxic ingredient of the insecticidal composition or can be employed in conjunction with other insecticidally-active materials. Representative insecticides of this latter class include the naturally-occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl-p-nitrophenyl thiophosphate, dimethyl 2,2-dichlorovinyl phosphate, 1,2-dibromo-2,2-dichloroethyl dimethyl phosphate, azobenzene, and the various compounds of arsenic, lead and/or fluorine. The crotonates of the invention may also be employed with other pesticides such as fungicides or nematocides, or may be used along with fertilizers, plant hormones, and the like.

I claim as my invention:

1. A compound of the formula

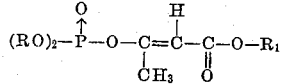

wherein R is an alkyl of 1–4 carbon atoms or middle halogen-substituted alkyl of 1–4 carbon atoms, and $R_1$ is a monovalent organic radical of up to 6 carbon atoms selected from the group consisting of alkenyl, alkynyl, mono-middle halogen-substituted alkenyl and mono-middle halogen-substituted alkynyl, the unsaturation occurring between any two carbon atoms of said organic radical except the carbon atom bonded to the oxygen atom of the oxycarbonyl moiety.

2. The compound of claim 1 wherein R is alkyl of 1–4 carbon atoms.
3. The compound of claim 2 wherein $R_1$ is alkenyl of up to 6 carbon atoms.
4. The compound of claim 2 wherein $R_1$ is alkynyl of up to 6 carbon atoms.
5. The compound of claim 2 wherein $R_1$ is mono-middle halogen-substituted alkynyl of up to 6 carbon atoms.
6. The compound of claim 3 wherein R is methyl.
7. The compound of claim 4 wherein R is methyl.
8. The compound of claim 5 wherein R is methyl.
9. Crotonic acid, 3-hydroxy-, allyl ester, dimethyl phosphate.
10. Crotonic acid, 3-hydroxy-, cis, 3-chloro-1,1-dimethyl-2-propynyl ester, dimethyl phosphate.
11. Crotonic acid, 3-hydroxy-, cis, 2-propynyl ester, dimethyl phosphate.
12. Crotonic acid, 3-hydroxy-, 2-butenyl ester, dimethyl phosphate.

References Cited

UNITED STATES PATENTS 2,685,552   8/1954   Stiles _____ 260—941 X

CHARLES B. PARKER, *Primary Examiner.*

A. H. SUTTO, *Assistant Examiner.*